F. SCHMIDT.
PUMP.
APPLICATION FILED MAR. 23, 1908.
954,471.
Patented Apr. 12, 1910.
2 SHEETS—SHEET 1.
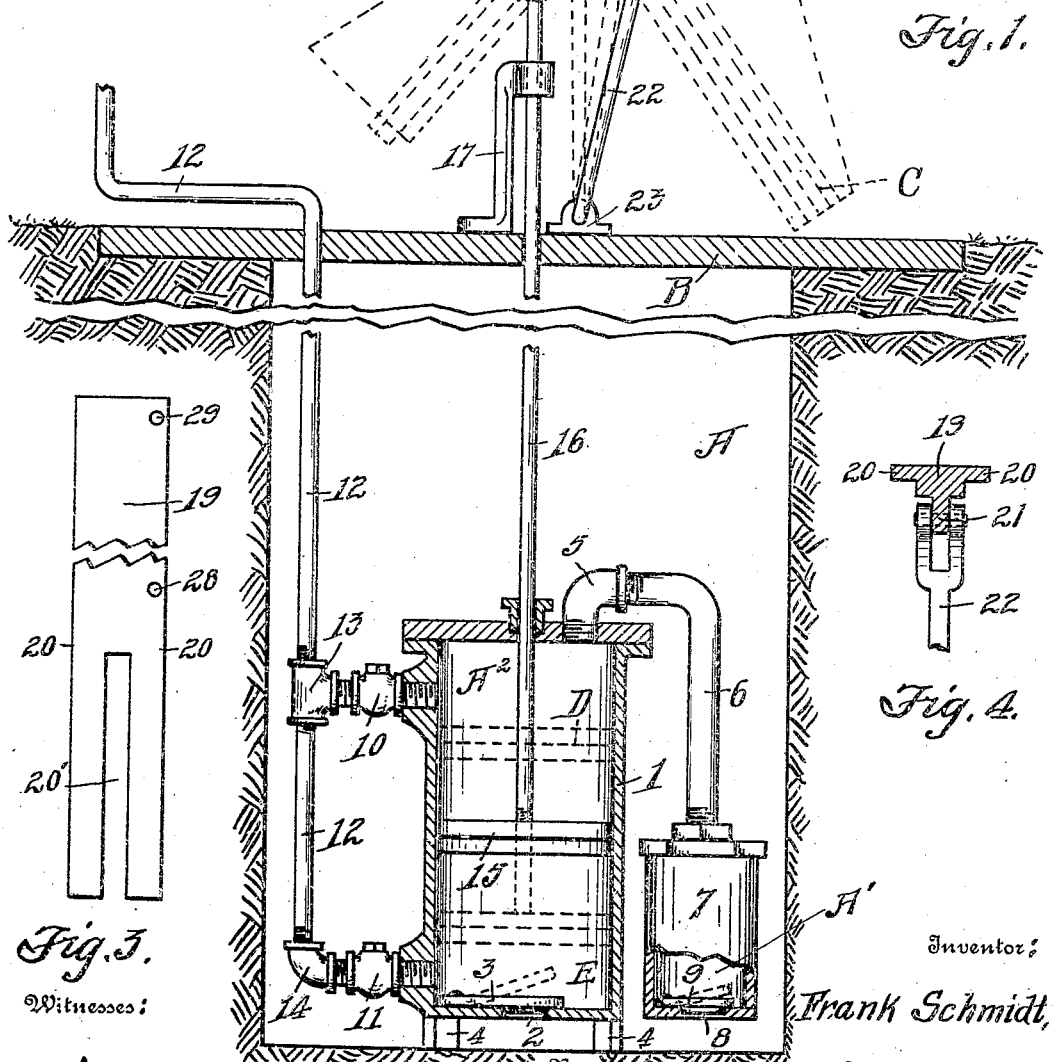
Witnesses:
Helen V. Reap.
Nancy C. Carlson
Inventor:
Frank Schmidt,
By F. J. Larson Co.
Attorneys.

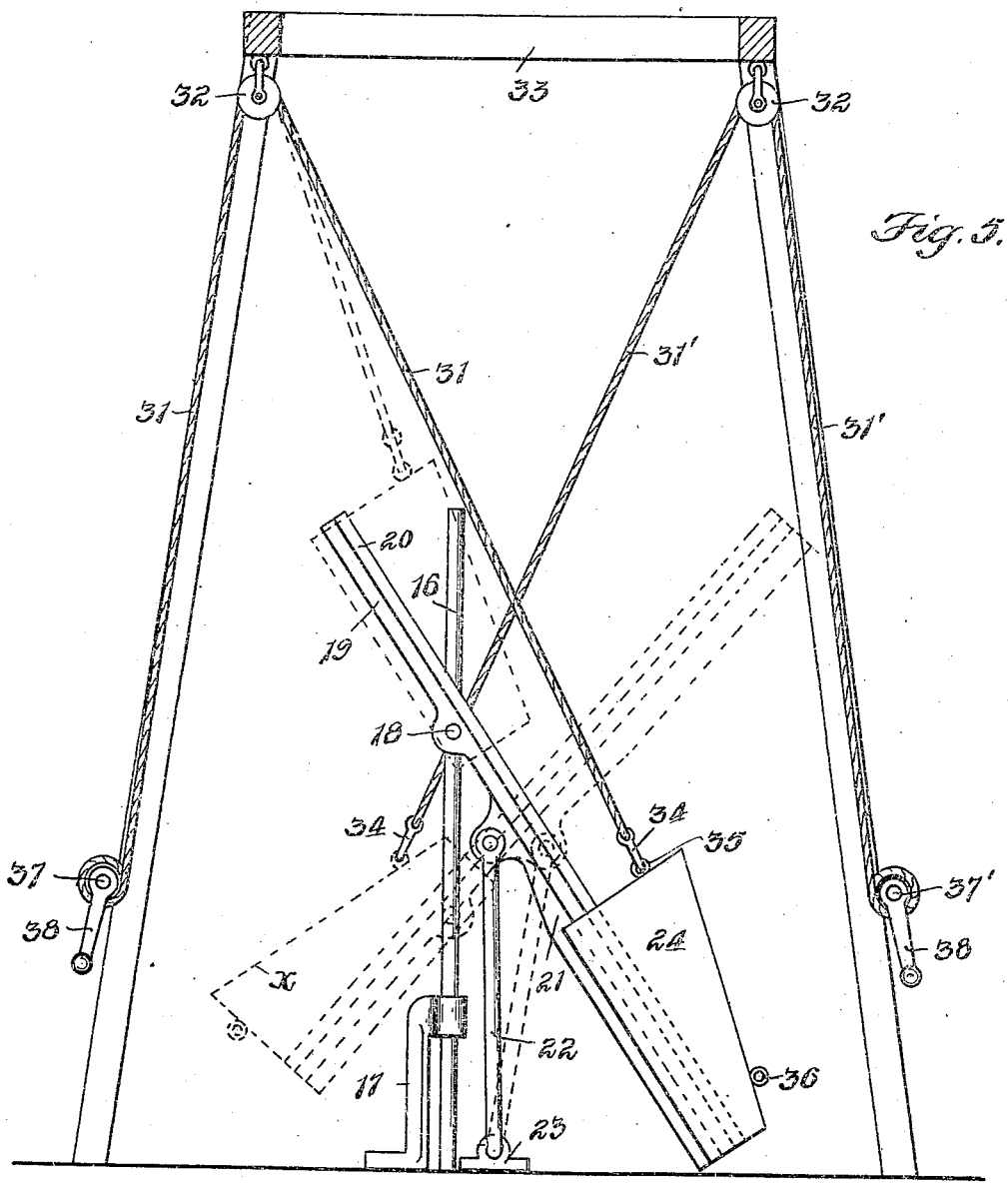

UNITED STATES PATENT OFFICE.

FRANK SCHMIDT, OF SOUTH OMAHA, NEBRASKA.

PUMP.

954,471. Specification of Letters Patent. Patented Apr. 12, 1910.

Application filed March 23, 1908. Serial No. 422,849.

*To all whom it may concern:*

Be it known that I, FRANK SCHMIDT, a citizen of the United States, residing at South Omaha, in the county of Douglas and State of Nebraska, have invented certain new and useful Improvements in Pumps, of which the following is a specification.

This invention relates to pumps and has for its object to provide a pump capable of being operated by means of a weight thus obviating the necessity of a windmill comprising unnecessary parts of machinery that depend on currents of air to operate same which continually get out of working order.

With these and other objects in view the invention consists in the novel construction and arrangement of parts hereinafter fully described and pointed out in the appended claims.

While the essential and characteristic features of the invention are susceptible to modification, still the preferred embodiment of the invention is clearly illustrated in the accompanying drawings, in which:

Figure 1, is a view showing my pump set up, and constructed in accordance with my invention. Fig. 2, is a detail of the sliding weight. Fig. 3, is a plan view of the operating arm. Fig. 4, is a transverse section thereof. Fig. 5, is a view showing the means for sliding the weight.

Like characters of reference denote corresponding parts throughout the several views.

Referring to the accompanying drawings the reference character A, designates a well, having the upper end thereof covered with a suitable covering B.

Located in the bottom of the well A, is a suitable cylinder 1, having the water inlet opening 2, in the bottom thereof and the hinged valve 3, for closing opening 2. A plurality of suitable legs 4, are secured to the bottom of the cylinder 1, to prevent the bottom thereof from seating in the sediment lying in the bottom of the well, thus preventing the hole 2, from becoming clogged to prevent the free passage of water into the cylinder from the bottom thereof. Suitably secured to the top of the cylinder 1, is an elbow 5, to which is connected the pipe 6, which extends downwardly alongside cylinder 1, and connected at its lower end to a cylinder 7, which has its lower end provided with a water inlet opening 8, the same size as that in the bottom of cylinder 1, and also provided with a suitable valve 9, for closing the same. Cylinder 1, is provided near the top and also near the bottom with a water outlet opening and pair of gate valves 10 and 11, which are each connected to the supply pipe 12, by means of the coupling 13 and 14. The supply pipe 12, extends upwardly and out of the well A, as clearly shown and may be extended to any suitable place and if desired provided with a valve for turning on or shutting off the flow of water therethrough when desired. Working within cylinder 1, is the piston head 15, having connection with the piston or pump rod 16. This rod 16, is suitably guided as at 17, to prevent lateral movement of the rod when in operation. Pivotally secured to the pump rod 16, at any suitable point above the top of the well A, as at 18, is an arm or lever 19, approximately T-shaped, having the flanges 20, the cutaway portion 20' and the lower central rib 21. Pivotally connected to the rib 21, adjacent the pivot point 18, is the rocking arm or link 22, having pivotal connection with a bearing 23, secured to the cover B, of the well A. Mounted upon the arm or lever 19, is a wedge shaped sliding weight 24, having the cutaway portion 25, and the grooves 26, adapted to receive the flanges 20, of the rod or lever 19, for guiding said weight when sliding from one end thereof to the other. This weight is also provided with an opening 27, when in its proper position at either end of the arm or lever 19, registers with either the opening 28 or 29, in one of the flanges 20, of the arm or lever 19. A pin or bolt 30, is adapted to pass through these openings to retain the weight in position during its travel.

In the drawings I have illustrated the weight 24, as being at the long end of the arm or lever 19. When the arm is horizontal as shown in full lines, the piston is in the center of cylinder 1, as shown. Now, as the lever lowers to the position as shown in dotted lines designated C, the piston has moved to the position as shown in dotted lines designated D, thereby causing valve 9, to close and the gate valve 10, to open allowing the water to enter the supply pipe 12. As the water enters this pipe 12, the weight of the water closes gate valve 11, thus retaining the water in pipe 12. During the upward travel of the piston 12, valve 3, was open allowing water to enter chamber E. Now, when the weight 24, is slid to the top or short end of arm or lever 19, which causes that end of arm to be the heavier thereby causing downward movement thereof which opens valves 9, to allow chamber A', to be filled with water and closing valve 3. During this downward movement of the piston 12, and weight 24, the water is forced through the gate valve 11, into pipe 12, and the pressure therein will close gate valve 10, to retain the water in pipe 12. By this arrangement of parts it will be observed there is always a supply of water in either of the chambers in cylinder 1, hence there is a steady flow of water through the supply 12.

The weight 24 is slid from one end of the arm or lever 19 by means of a pair of cables 31 and 31', which travel over pulleys 32 secured to the upper end of the derrick or frame 33. Each cable is provided at one end with a hook 34, which is adapted to engage either of the eyebolts 35 or 36 and the opposite ends are secured to the shafts 37 and 37' each of which is provided with a handle 38, for winding the cables 31 and 31' about the shafts for raising the weight. To raise the weight from the lower position as shown in full lines in Fig. 5, to that shown in dotted lines in the upper position, the operator removes the bolt 30 shown in Fig. 1, and turns handle 38 of shaft 37, which causes cable 31 to wind about shaft 37, thereby raising the weight. When the weight has been raised the pin 30 is again inserted and the weight drops gradually to the position shown in dotted lines marked X. When it is desired to raise the weight from this position, cable 31' is employed instead of cable 31 as is manifest.

What I claim is:—

1. In a pump, the combination with a cylinder having a water inlet opening at its top and bottom and a water outlet opening near its top and bottom, of a pump rod, a flanged lever pivoted thereto intermediate one of its ends and its center, a rocking bar pivoted near the center of said lever, a weight having a cutaway portion slidably mounted on said lever, and means for raising said weight from its lowermost position to its highest position.

2. In a pump, the combination with a cylinder having a water inlet opening at its top and bottom and a water outlet opening near its top and bottom, of a pump rod, a flanged lever having a slotted opening in one end thereof pivotally connected to said pump rod, an upright rocking bar pivotally connected to said lever, a wedge-shaped weight having a cutaway portion and provided with a pair of oppositely disposed grooves adapted to slide upon said lever, means for holding said weight in position on said lever, and means for sliding said weight from one end of said lever to the other.

In testimony whereof I have signed my name to the specification in the presence of two subscribing witnesses.

FRANK SCHMIDT.

Witnesses:
 JOHN BRIGGS,
 ALBERT T. SHAEFFER.